United States Patent
Enomoto et al.

(10) Patent No.: US 11,285,890 B2
(45) Date of Patent: Mar. 29, 2022

(54) WIRE HARNESS ROUTING STRUCTURE FOR PANEL, HARNESS MODULE, AND WIRE HARNESS ROUTING METHOD FOR PANEL

(71) Applicant: YAZAKI CORPORATION, Tokyo (JP)

(72) Inventors: Satoshi Enomoto, Utsunomiya (JP); Masashi Nakamura, Utsunomiya (JP); Shinichi Tadokoro, Utsunomiya (JP); Tomokazu Kato, Utsunomiya (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/924,205

(22) Filed: Jul. 9, 2020

(65) Prior Publication Data
US 2021/0009050 A1    Jan. 14, 2021

(30) Foreign Application Priority Data
Jul. 9, 2019 (JP) .............................. JP2019-127321

(51) Int. Cl.
*B60R 16/02* (2006.01)
*H01B 7/00* (2006.01)
*H01B 13/012* (2006.01)

(52) U.S. Cl.
CPC ....... *B60R 16/0215* (2013.01); *H01B 7/0045* (2013.01); *H01B 13/01209* (2013.01)

(58) Field of Classification Search
CPC ...... H01B 7/0045; H01B 7/08; H01B 7/0823; H01B 7/17; H01B 13/01209; H01R 2201/26; H02G 3/00; H02G 3/30; H02G 3/36; B60R 16/0215
USPC ................ 174/72 A; 439/34; 29/857; 296/70
See application file for complete search history.

(56) References Cited

U.S. PATENT DOCUMENTS

| | | | | |
|---|---|---|---|---|
| 3,494,657 A | * | 2/1970 | Harper | B62D 21/17 280/421 |
| 4,210,773 A | * | 7/1980 | Haley | H01B 7/0853 174/72 A |
| 4,824,164 A | * | 4/1989 | Nakayama | H02G 3/00 296/146.7 |

(Continued)

FOREIGN PATENT DOCUMENTS

| JP | S62-296306 A | 12/1987 |
|---|---|---|
| JP | H9-23540 A | 1/1997 |

(Continued)

*Primary Examiner* — William H. Mayo, III
*Assistant Examiner* — Krystal Robinson
(74) *Attorney, Agent, or Firm* — Kenealy Vaidya LLP (57) ABSTRACT

A wire harness routing structure for a panel, includes: a panel member that includes a first surface and a second surface opposite to the first surface; and a wire harness that is routed to the panel member. The first surface has a harness accommodating groove that accommodates a harness main body of the wire harness, the harness accommodating groove being recessed toward the second surface. A resin cured portion that holds the harness main body is formed in the harness accommodating groove. The resin cured portion is formed by a resin with which a predetermined range of the harness accommodating groove is filled and which is cured.

11 Claims, 9 Drawing Sheets

(56) References Cited

U.S. PATENT DOCUMENTS

| | | | | |
|---|---|---|---|---|
| 4,943,241 | A * | 7/1990 | Watanabe | B60R 16/0207 174/72 A |
| 4,950,168 | A * | 8/1990 | Watanabe | H01R 9/2458 439/701 |
| 5,735,041 | A * | 4/1998 | Zaguskin | B60R 16/0215 29/857 |
| 6,000,959 | A * | 12/1999 | Curtindale | B60J 5/0418 439/246 |
| 6,048,020 | A * | 4/2000 | Gronowicz | B60R 16/0238 174/72 A |
| 6,092,854 | A * | 7/2000 | Campbell | B60R 13/0846 296/70 |
| 6,120,327 | A * | 9/2000 | O'Brien | B60R 16/0215 174/72 A |
| 6,142,556 | A * | 11/2000 | Tanaka | B60R 16/0207 296/146.7 |
| 6,257,897 | B1 * | 7/2001 | Kubota | B60H 1/00557 439/34 |
| 6,344,613 | B1 * | 2/2002 | Kolodziej | B60R 16/0207 174/268 |
| 6,428,081 | B1 * | 8/2002 | Williams, Jr. | B60R 16/0215 296/146.7 |
| 6,494,522 | B1 * | 12/2002 | Drewniok | H05K 1/118 296/146.7 |
| 6,799,786 | B2 * | 10/2004 | Hein | B60R 16/0215 296/70 |
| 10,023,134 | B2 * | 7/2018 | Osada | B60R 13/0243 |
| 11,034,313 | B2 * | 6/2021 | Nishimura | B60R 16/02 |
| 2013/0292159 | A1 * | 11/2013 | Gotou | B60R 16/0215 174/250 |
| 2016/0027555 | A1 * | 1/2016 | Nagasu | H01L 39/2454 505/231 |

FOREIGN PATENT DOCUMENTS

| | | | |
|---|---|---|---|
| JP | H0923540 | A * | 1/1997 |
| JP | H11-195327 | A | 7/1999 |
| JP | 2004-123036 | A | 4/2004 |
| JP | 2007-130914 | A | 5/2007 |
| JP | 5410041 | B2 | 2/2014 |
| JP | 6053430 | B2 | 12/2016 |
| JP | 2017-175069 | A | 9/2017 |
| WO | 2012/035795 | A1 | 3/2012 |
| WO | 2012/124200 | A1 | 9/2012 |

* cited by examiner

WIRE HARNESS ROUTING STRUCTURE FOR PANEL, HARNESS MODULE, AND WIRE HARNESS ROUTING METHOD FOR PANEL

CROSS-REFERENCES TO RELATED APPLICATIONS

This application is based on and claims priority from Japanese Patent Application No. 2019-127321 filed on Jul. 9, 2019, the entire contents of which are incorporated herein by reference.

FIELD

Aspects of the present invention relate to a structure and a method of routing a wire harness to a panel, and a harness module that employs the routing structure.

BACKGROUND

In an automobile, for example, a wire harness is routed in an appropriate path for electrical connection between devices. The wire harness generally includes a plurality of electric wires, which are bundled by tape winding or the like and protected by a tubular exterior member. In fixing the wire harness at the time of routing, a plurality of clips or holding members are used, and the wire harness is routed to a panel member with the clips or holding members. JP-B-6053430 discloses a wire harness routed to a door of an automobile, and JP-B-5410041 discloses a wire harness routed to a seat of an automobile.

SUMMARY

In the related art described above, the routing of the wire harness requires a lot of efforts, such as tape winding, protection by an exterior member, fixing to a panel member using a clip or the like.

Aspects of the invention have been made in view of the above circumstances, and an object thereof is to provide a wire harness routing structure and a wire harness routing method for a panel which are capable of improving workability of routing. Another object thereof is to provide a harness module that employs the wire harness routing structure for a panel.

In a first aspect of the invention, there is provided a wire harness routing structure for a panel, including: a panel member that comprises a first surface and a second surface opposite to the first surface; and a wire harness that is routed to the panel member, wherein the first surface has a harness accommodating groove that accommodates a harness main body of the wire harness, the harness accommodating groove being recessed toward the second surface, wherein a resin cured portion that holds the harness main body is formed in the harness accommodating groove, and the resin cured portion is formed by a resin with which a predetermined range of the harness accommodating groove is filled and which is cured.

According to the first aspect of the invention, since the harness main body is accommodated in the harness accommodating groove formed in the panel member, it is possible to prevent looseness of electric wires even without tape winding that is performed in the related art. In other words, it is possible to keep the electric wires in a state similar to that in a case where the electric wires are bundled. In addition, since the harness main body is accommodated in the harness accommodating groove, it is possible to easily form a shape conforming to a routing path (a path routing shape of the harness main body). Further, since the predetermined range of the harness accommodating groove is filled with a resin, and the resin is in a cured state, the harness main body can be held by the resin in the cured state, that is, by the resin cured portion. In other words, even if, for example, tape winding is not performed over a wide range or a fixing operation using a clip or the like to a plurality of places is not performed, the harness main body can be held by the filling and curing of the resin alone, and as a result, the workability can be improved as compared with that in the related art. Further, since the harness main body is accommodated in the harness accommodating groove, the harness main body can be protected without using a tubular exterior member. Further, since the tape winding, the clip, the exterior member, and the like are unnecessary, not only cost reduction because of component reduction but also automatic production can be achieved. Further, when the resin cured portion is made of insulating resin, it is possible to secure insulation with respect to the harness main body in a portion where the resin cured portion is formed.

In a second aspect of the invention, there is provided the wire harness routing structure for a panel according to the first aspect, wherein the resin cured portion is formed of a foamed resin.

According to the second aspect of the invention, since the resin cured portion is formed of the foamed resin, it is possible to peel and replace the wire harness from the panel member at the time of maintenance. In addition, the maintenance performance can be secured by employing the resin cured portion formed of the foamed resin. In a case where a resin not allowing peeling (a resin in a solid state not containing foam or air bubbles) is employed, the whole part including the panel member in addition to the wire harness needs to be replaced, but the resin cured portion of the second aspect of the invention does not require such a replacement work. Further, since the resin cured portion is formed of the foamed resin, weight reduction can be achieved as compared with a case where the resin is not a foamed resin, and vibration absorbing property, cushioning property or the like can be exhibited. For example, in a case of the vibration absorbing property being exhibited, the electric wire constituting the harness main body can be protected from vibration, and damage to the electric wire due to the vibration can be prevented. In addition, if the vibration is absorbed, the quietness required for the automobile can also be secured. Regarding a state of foaming, either independent foaming or continuous foaming may be used. A degree of elasticity (flexibility) thereof is set as appropriate.

In a third aspect of the invention, there is provided the wire harness routing structure for a panel according to the first aspect or the second aspect, wherein the harness accommodating groove has a depth to prevent the harness main body from protruding from an opening of the harness accommodating groove to outside.

According to the third aspect of the invention, since the harness accommodating groove has the depth to prevent the harness main body from protruding from the groove opening to the outside (in other words, since the depth of the harness accommodating groove is larger than a diameter of the harness main body), the harness main body is embedded with the resin cured portion, and as a result, the harness main body can be protected without using the tubular exterior member. Further, since the harness accommodating groove having the depth described above, the resin cured portion can also be prevented from protruding from the opening of the harness accommodating groove to the outside, and damage, peeling-off, and the like of the resin cured portion due to catching or the like can be prevented.

In a fourth aspect of the invention, there is provided the wire harness routing structure for a panel according to any one of the first aspect to the third aspect, wherein at least one a temporary holding portion that temporarily holds the harness main body is formed inside the harness accommodating groove.

According to the fourth aspect of the invention, since at least one temporary holding portion is formed inside the harness accommodating groove, the harness main body can be temporarily held in a period until the completion of the filling and curing of the resin. Accordingly, during the period, it is unnecessary for a worker to continue to hold the harness main body, and as a result, the workability can be improved.

In a fifth aspect of the invention, there is provided the wire harness routing structure for a panel according to any one of the first aspect to the fourth aspect, wherein a gate portion is formed at a portion defining the predetermined range to prevent outflow of the resin that has not cured.

According to the fifth aspect of the invention, since the gate portion is formed in the harness accommodating groove, the resin is prevented from flowing out of the harness accommodating groove by the gate portion. That is, it is possible to retain the resin until the resin is cured, and as a result, it is possible to secure shape stability of the resin cured portion.

In a sixth aspect of the invention, there is provided the wire harness routing structure for a panel according to any one of the first aspect to the fifth aspect, wherein the harness accommodating groove also serves as a panel reinforcing portion of the panel member.

According to the sixth aspect of the invention, since the harness accommodating groove functions as the panel reinforcing portion, the strength of the panel member can be increased. Accordingly, it is unnecessary to provide a dedicated reinforcing member, and the number of components and the cost can be reduced.

In a seventh aspect of the invention, there is provided a harness module including: the wire harness routing structure for a panel according to any one of the first aspect to the sixth aspect; and at least one of a device and a component that is connected to the wire harness and mounted to the panel member.

According to the seventh aspect of the invention, since the harness module employs the wire harness routing structure for a panel according to any one of the first aspect to the sixth aspect, the workability of routing is improved, and as a result, a better harness module can be provided.

In an eighth aspect of the invention, there is provided the harness module according to the seventh aspect, wherein the harness module is formed for a door, a seat, an instrument panel, a floor, or a roof.

According to the eighth aspect of the invention, it is possible to provide a harness module for a door, a seat, an instrument panel, a floor, or a roof in an automobile.

In a ninth aspect of the invention, there is provided a wire harness routing method for a panel, including: accommodating a harness main body of a wire harness in a harness accommodating groove that is formed on a first surface of a panel member and recessed toward a second surface of the panel member opposite to the first surface; and filling a predetermined range of the harness accommodating groove with a resin in a state where the harness main body is accommodated in the harness accommodating groove, and causing the resin to cure.

According to the ninth aspect of the invention, in routing the wire harness to the panel member, first, the harness main body is accommodated in the harness accommodating groove, and next the predetermined range of the harness accommodating groove is filled with the resin, and the resin is cured, and therefore the wire harness can be easily routed.

According to the wire harness routing structure and method for a panel of aspects of the invention, since the harness main body accommodated in the harness accommodating groove is held by the resin cured portion formed in the predetermined range of the harness accommodating groove, the workability of routing can be improved as compared with that in the related art. Further, the number of components can be reduced as compared with that in the related art, and also the mounting man-hour and cost can be reduced because of the reduction of the number of components.

Further, according to the harness module of aspects of the invention, since the wire harness routing structure for a panel is employed, it is possible to improve the workability of routing, and as a result, it is possible to provide a better harness module.

DETAILED DESCRIPTION

A wire harness routing structure for a panel includes a panel member that includes a first surface and a second surface opposite to the first surface, and a wire harness that is routed to the panel member. The first surface of the panel member has a harness accommodating groove recessed toward the second surface. The harness accommodating groove is formed in a portion for accommodating a harness main body of the wire harness. The harness main body accommodated in the harness accommodating groove is held by a resin cured portion that is formed by a resin with which a predetermined range of the harness accommodating groove is filled and which is cured. The resin cured portion is formed of a foamed resin that can be peeled off from the harness accommodating groove at the time of intended removal of the wire harness.

Figure 1:
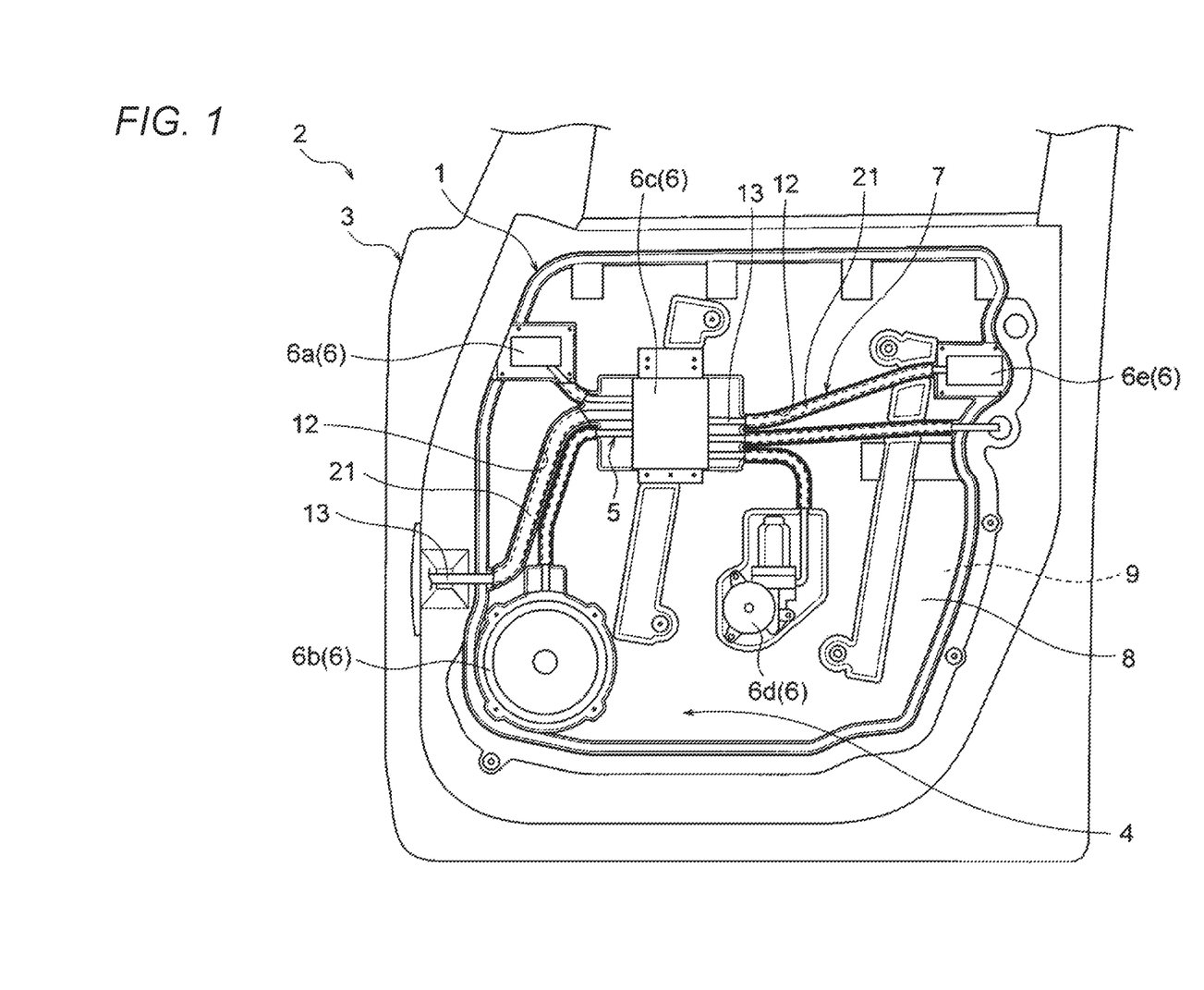
FIG. 1 is a configuration diagram of a door illustrating a harness module and a wire harness routing structure for a panel according to an embodiment of the invention.
Figure 2:
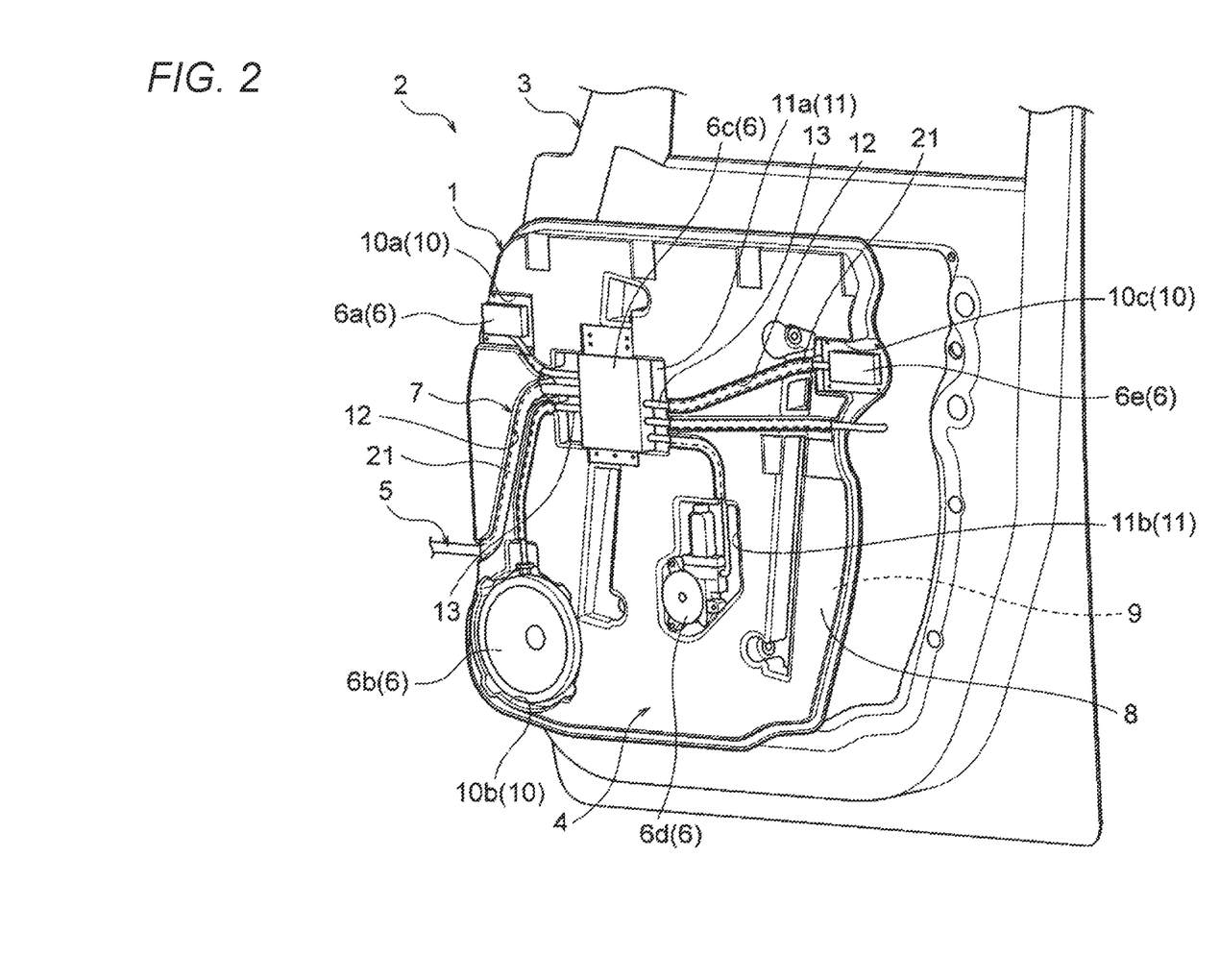
FIG. 2 is an exploded perspective view of the door of FIG. 1.
Figure 3:
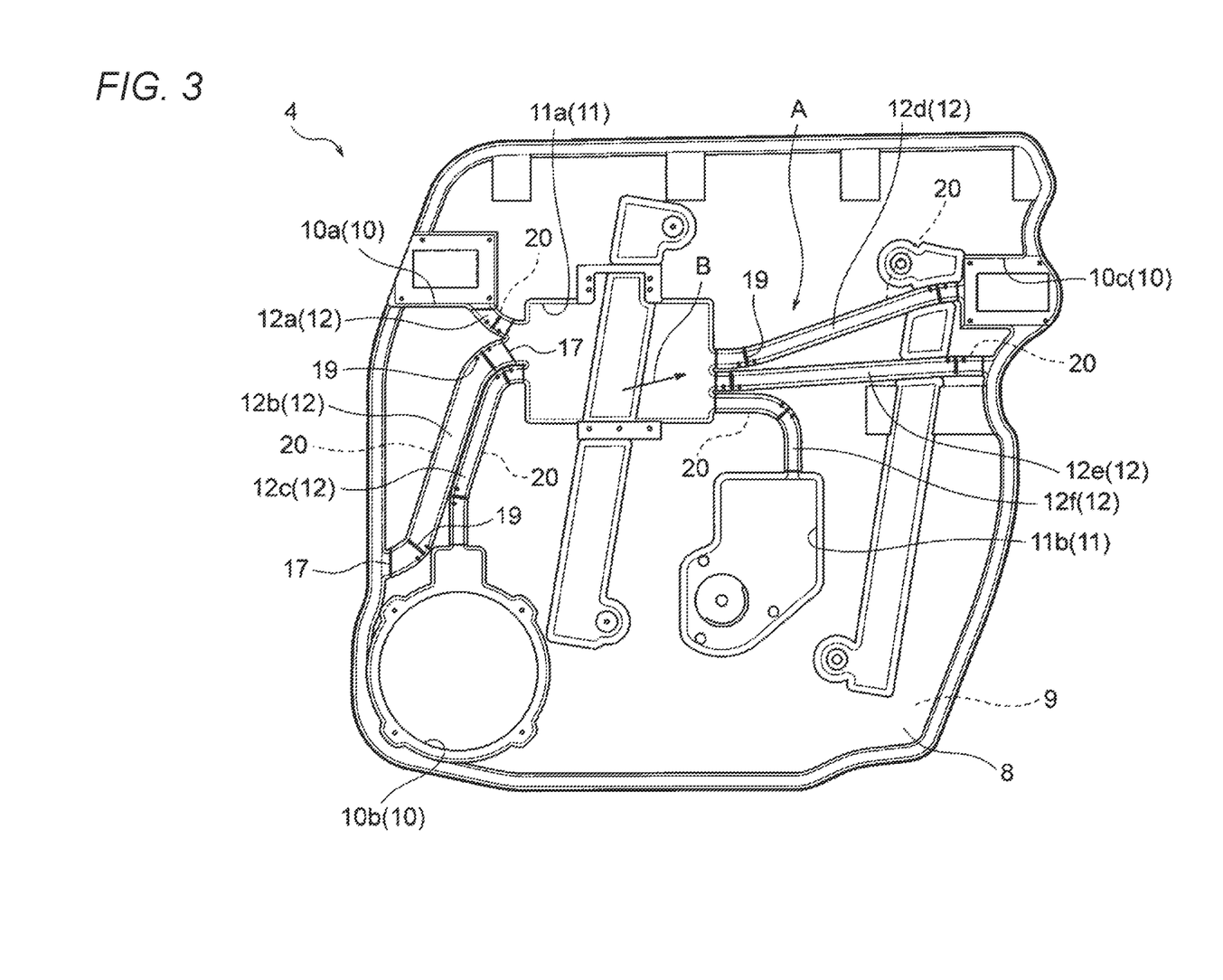
FIG. 3 is a front view of a panel member.
Figure 4:
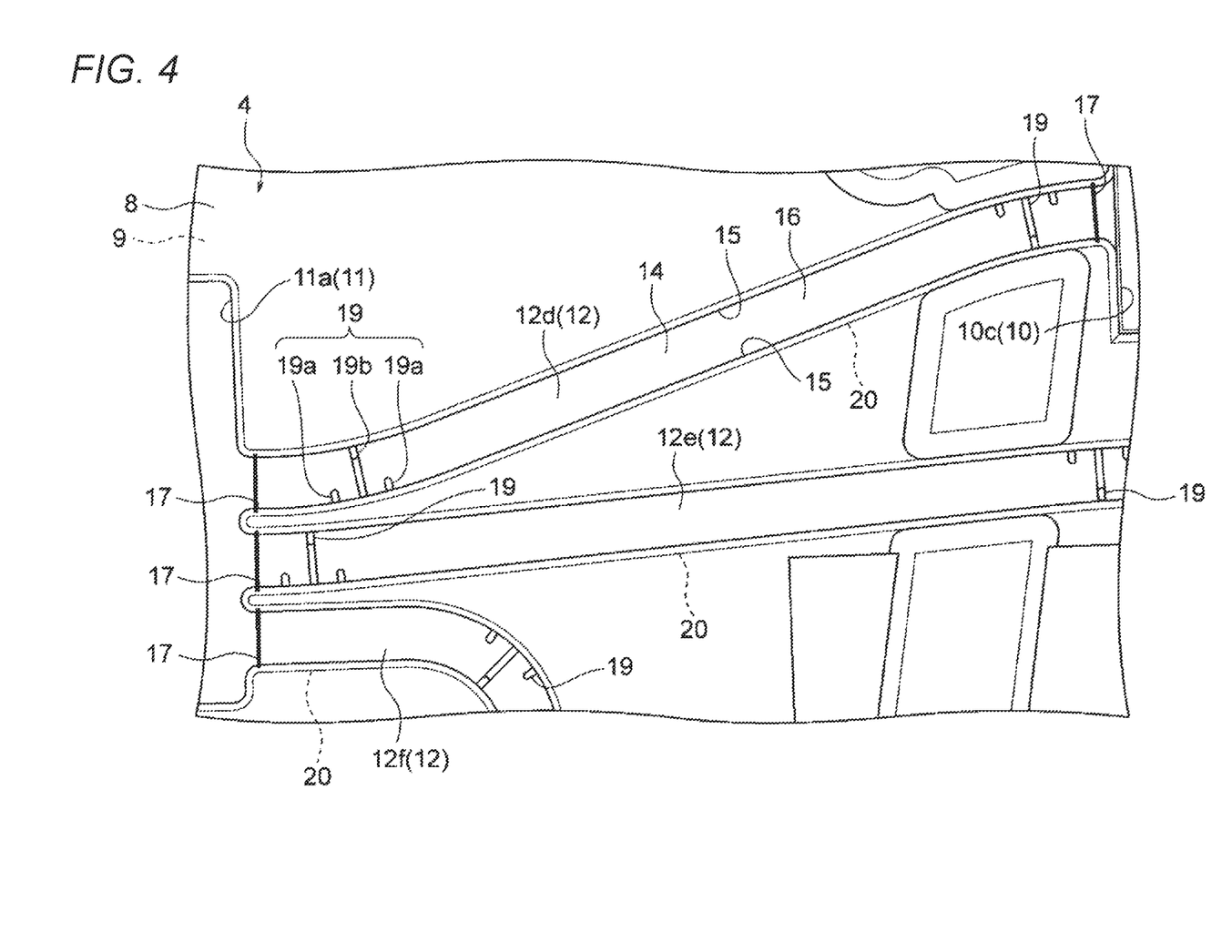
FIG. 4 is an enlarged view of a portion indicated by an arrow A in FIG. 3.
Figure 5:
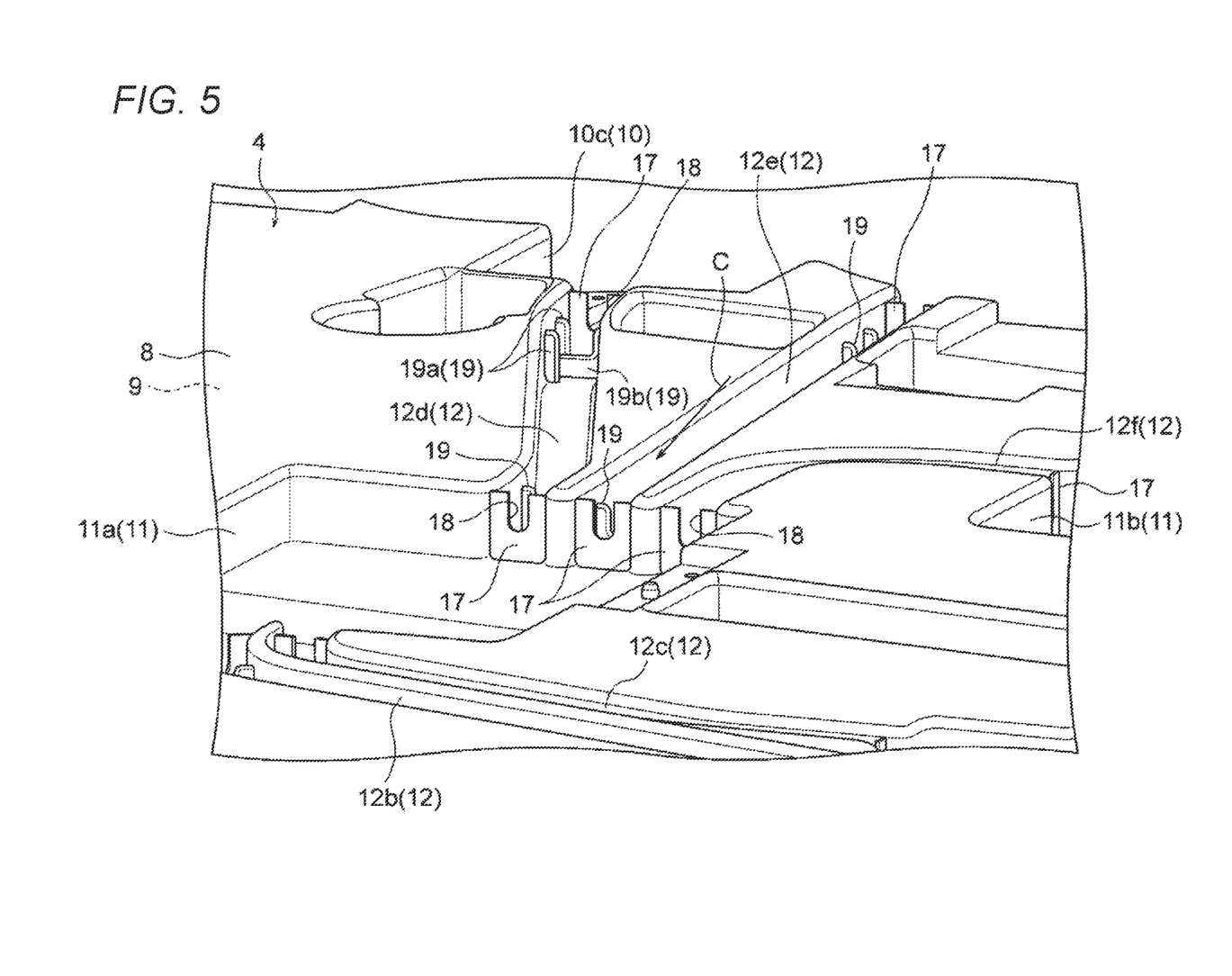
FIG. 5 is a perspective view of a harness accommodating groove as viewed from a direction indicated by an arrow B in FIG. 3.
Figure 6:
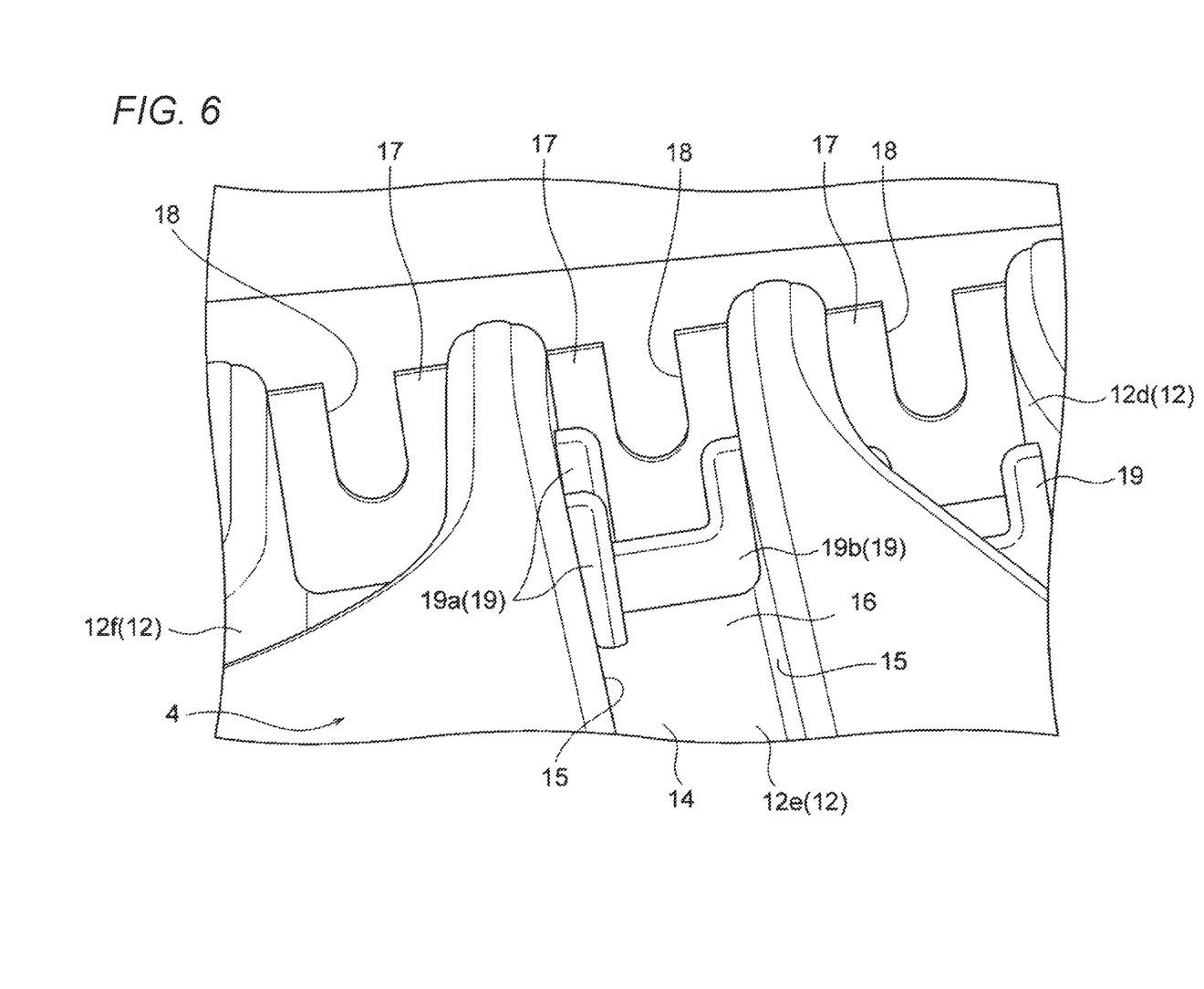
FIG. 6 is an enlarged view of the harness accommodating groove as viewed from a direction indicated by an arrow C in FIG. 5.
Figure 7:
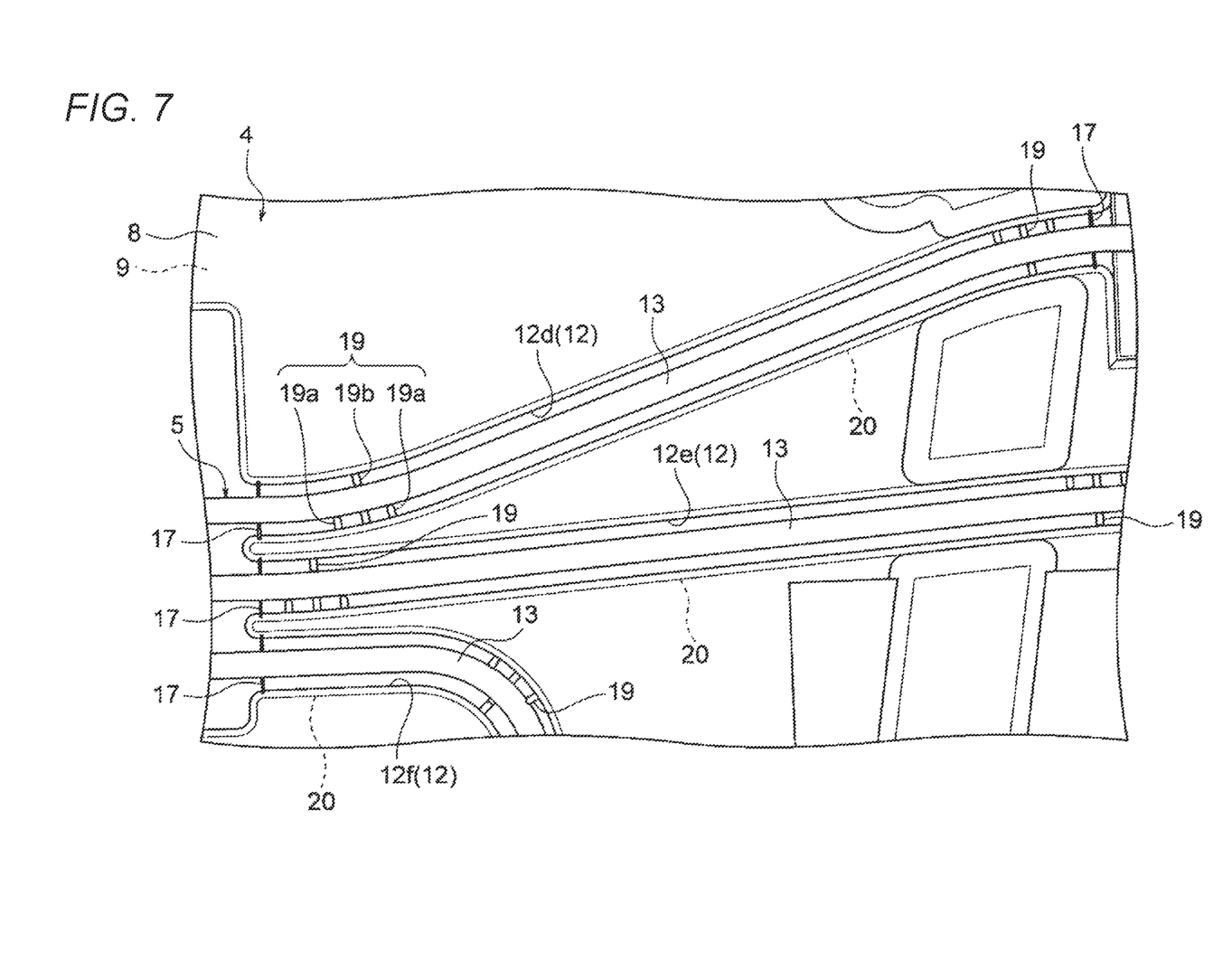
FIG. 7 is a diagram illustrating a state in which a harness main body is accommodated in the harness accommodating groove.
Figure 8:
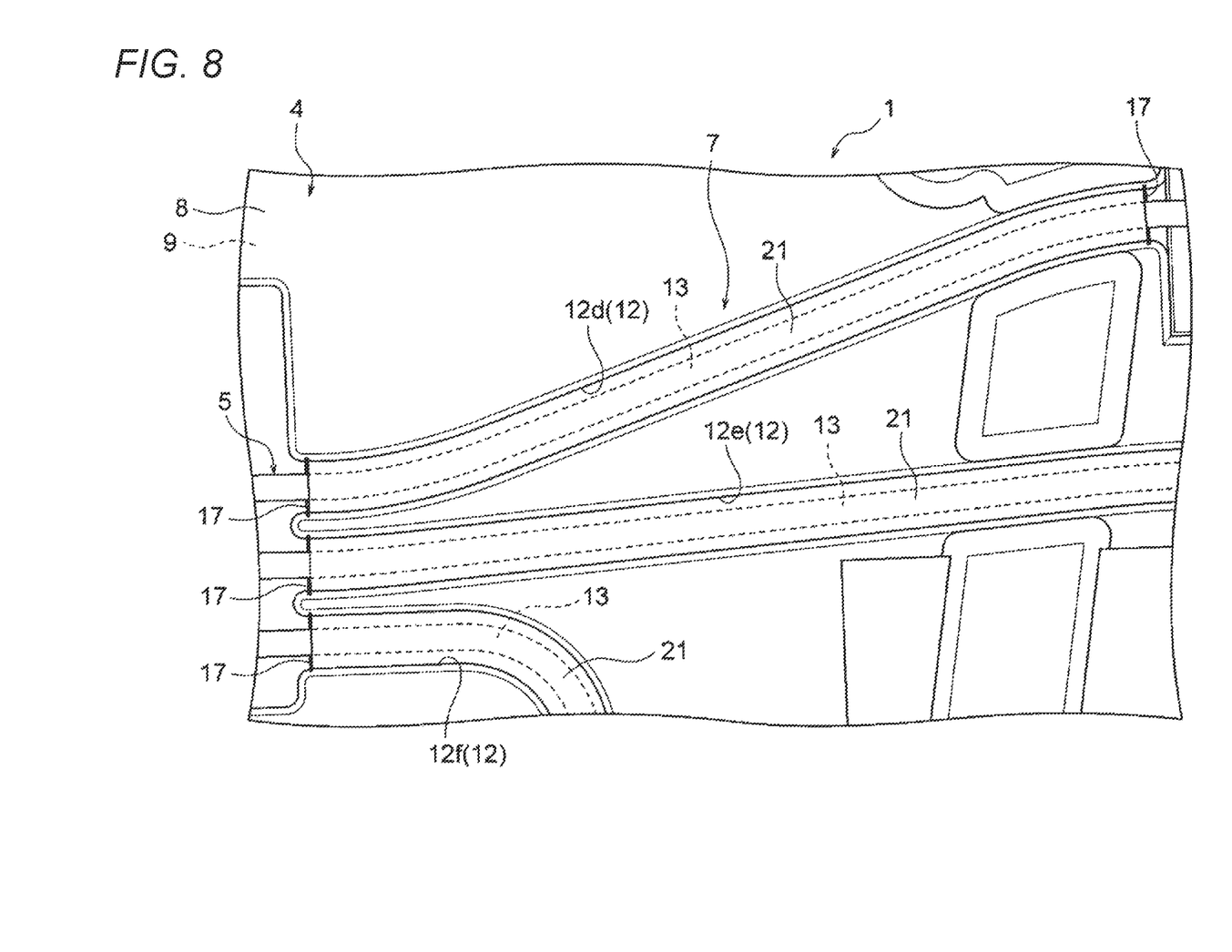
FIG. 8 is a view illustrating a state in which the harness main body accommodated in the harness accommodating groove is held by a resin cured portion.
Figure 9:
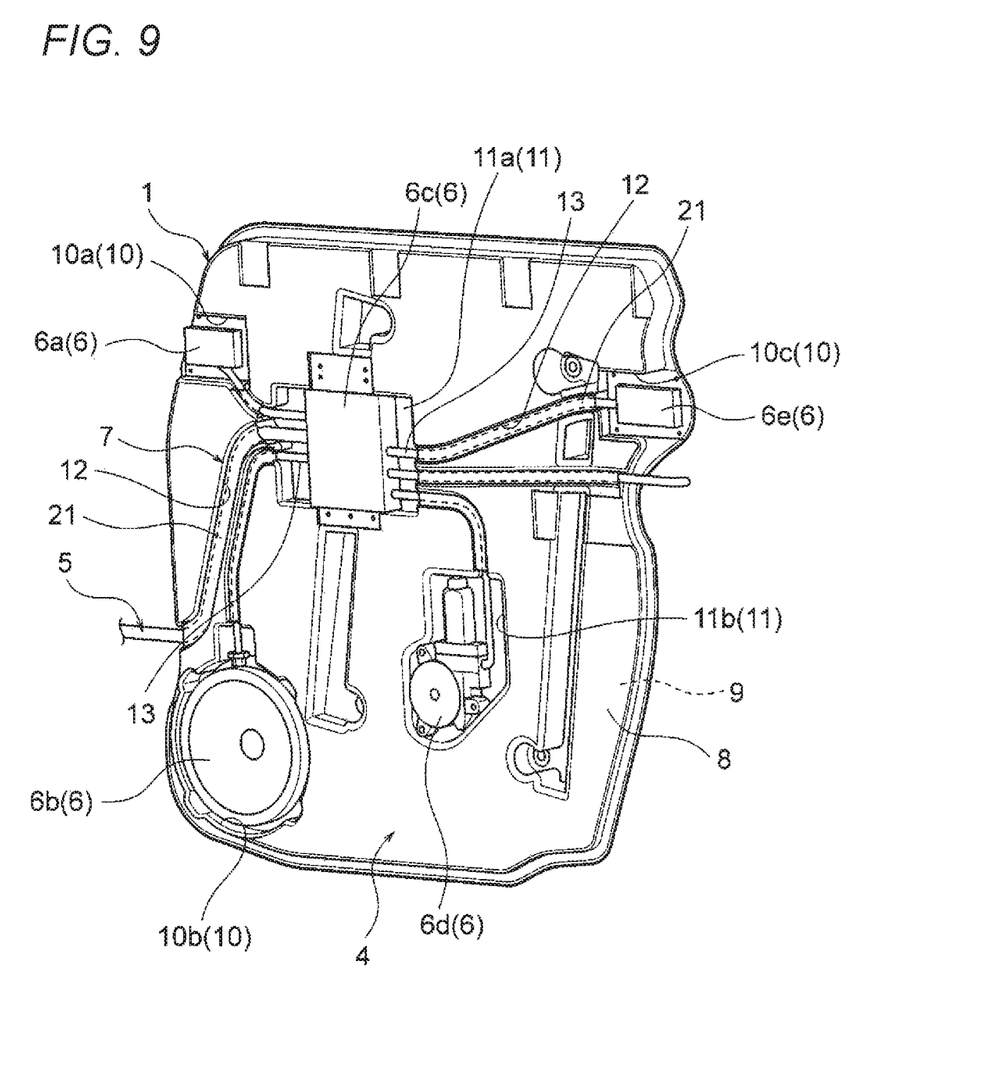
FIG. 9 is a perspective view of the harness module.

Exemplary embodiments will be described below with reference to the drawings. FIG. 1 is a configuration diagram of a door illustrating a harness module and a wire harness routing structure for a panel according to an embodiment of the invention. FIG. 2 is an exploded perspective view of the door of FIG. 1. FIG. 3 is a front view of a panel member. FIG. 4 is an enlarged view of a portion indicated by an arrow A in FIG. 3. FIG. 5 is a perspective view of a harness accommodating groove as viewed from a direction indicated by an arrow B in FIG. 3. FIG. 6 is an enlarged view of the harness accommodating groove as viewed from a direction indicated by an arrow C in FIG. 5. FIG. 7 is a diagram illustrating a state in which a harness main body is accommodated in the harness accommodating groove. FIG. 8 is a diagram illustrating a state in which the harness main body accommodated in the harness accommodating groove is held by a resin cured portion. FIG. 9 is a perspective view of the harness module.

<Harness Module 1>

In FIGS. 1 and 2, reference numeral 1 denotes a harness module. In the present embodiment, a harness module 1 is for an automobile, and is mounted to, for example, a door main body 3 constituting a door 2 on a driver seat side. The harness module 1 includes a panel member 4 that is formed of a resin, a wire harness 5 that is routed to a panel member 4, and a plurality of components 6 (6a to 6e) that are connected to the wire harness 5 and mounted to the panel member 4. The harness module 1 employs a wire harness routing structure 7 for a panel, which will be described below, and can improve workability of the routing of the wire harness 5 as compared with a harness module in the related art. Further, the number of components can be reduced as compared with that in the related art, and the mounting man-hour and the cost can be reduced because of the reduction of the number of components. Although the harness module 1 of the present embodiment is for a door, it is also possible to apply the harness module 1 to a seat, an instrument panel, a floor, a roof, and the like of an automobile by having the following characteristics to be described below.

<Panel Member 4>

In FIGS. 1 to 3, the panel member 4 is a relatively large resin molded article in an automobile, and is formed into a wall plate shape (panel shape) as illustrated. The panel member 4 may be referred to as a "module panel", for example. The panel member 4 has one surface 8 (an example of a first surface) and the other surface 9 (an example of a second surface), and here, the visible side (front side) in FIG. 3 is defined as the one surface 8. In the panel member 4, a plurality of component mounting portions 10, 11 (10a to 10c, 11a to 11b) for the plurality of components 6 are formed. In addition, in the panel member 4, a plurality of harness accommodating grooves 12 (12a to 12f) are also formed. The component mounting portion 10 is formed in a portion penetrating the panel member 4. The component mounting portion 11 and the harness accommodating groove 12 are formed by recessing the one surface 8 toward a side of the other surface 9. The harness accommodating groove 12 is formed to be a groove portion connecting the component mounting portions 10 and 11, as viewed from a one surface 8 side. The harness accommodating groove 12 is one of portions constituting the wire harness routing structure 7 for a panel. The harness accommodating groove 12 will be described in more detail below.

<Harness Accommodating Groove 12>

In FIGS. 3 to 6, the harness accommodating groove 12 is formed in a groove portion accommodating the harness main body 13 to be described below. In the present embodiment, since there are 6 harness main bodies 13, six harness accommodating grooves 12 are also formed. The harness accommodating groove 12 is formed in accordance with a routing path of the harness main body 13. The harness accommodating groove 12 has a groove bottom 14, a pair of groove side portions 15 disposed on both sides of the groove bottom 14, and a groove opening 16. The harness accommodating groove 12 is formed to have a depth at which the harness main body 13 does not protrude to the outside from the groove opening 16. Specifically, the harness accommodating groove 12 is formed to have a depth at which a foamed resin (foamed resin material) used in forming a resin cured portion 21 (see FIG. 8) to be described below does not flow from the groove opening 16 to the outside even when covering the harness main body 13. The harness accommodating groove 12 is formed to have the same depth over an entire range from one end to the other end. To give a supplementary description regarding the depth, the resin cured portion 21 is formed in an entire range from one end to the other end of the harness accommodating groove 12 in the present embodiment. Therefore it is deep over the entire range of the harness accommodating groove 12, but the depth may vary therein, for example, in a case where the resin cured portion 21 is not formed partially in the harness accommodating groove 12. That is, in a portion where the resin cured portion 21 is not formed, the bottom of the harness accommodating groove 12 may be raised such that the harness main body 13 is located at the groove opening 16. From the viewpoint of protecting the harness main body 13, it is preferable to have the resin cured portion 21 formed in the entire range without forming the raised bottom.

A gate portion 17 is formed at a portion defining the predetermined range of the harness accommodating groove 12. In the present embodiment, the predetermined range is described as being an entire part of the harness accommodating groove 12. In this case, the portion defining the predetermined range includes one end and the other end of the harness accommodating groove 12, in other words, a portion of the harness accommodating groove 12 continuous with the component mounting portions 10 and 11. The gate portion 17 is formed to be a resin flow stop portion to prevent outflow of the foamed resin (foamed resin material) used for forming the resin cured portion 21 (see FIG. 8) to be described below before the resin is cured. The gate portion 17 is formed to be a wall-like portion so as to block one end and the other end of the harness accommodating groove 12 and has a U-shaped slit 18 that allows the harness main body 13 to pass therethrough. The slit 18 is formed by cutting the gate portion 17 at a width corresponding to a diameter of the harness main body 13. Note that the formation of the gate portion 17 is optional as long as the resin is a foamed resin (a foamed resin having a high viscosity) having poor fluidity (or a resin that is immediately cured). The gate portion 17 may be provided at a position necessary for forming the resin cured portion 21 (a portion defining the predetermined range of the harness accommodating groove 12), and is not limited to positions of one end and the other end of the harness accommodating groove 12.

A temporary holding portion 19 is formed in the middle of the harness accommodating groove 12 and/or in the vicinity of the gate portion 17. The temporary holding portion 19 is formed to be a portion that temporarily holds the harness main body 13. The temporary holding portion 19 is formed so as to fit within a groove inner portion of the harness accommodating groove 12. The temporary holding portion 19 is formed to include a pair of I-shaped portions 19a and an L-shaped portion 19b disposed therebetween, with which the harness main body 13 is sandwiched. As can be seen from the shapes of the pair of I-shaped portions 19a and the L-shaped portion 19b, the temporary holding portion 19 not only serves for temporary holding, but also raises the harness main body 13 from a groove bottom 14 to allow the resin cured portion 21 to be described below to be inserted under the harness main body 13. The temporary holding portion 19 may be formed at least at one place in the harness accommodating groove 12 from the viewpoint of the temporary holding described above, and is preferably formed at two or more places in order to temporarily hold the harness main body 13 in a stable state until curing of the foamed resin (foamed resin material) is completed.

As viewed from the side of the other surface 9 of the panel member 4, the harness accommodating groove 12 is formed to be a rib-like portion. Therefore, the harness accommodating groove 12 is also formed to function as a reinforcing portion of the panel member 4, that is, as a panel reinforcing portion 20. Even if the panel member 4 has a lesser thickness, since the panel member 4 has a plurality of harness accommodating grooves 12, the strength thereof can be maintained without providing a reinforcing component as a separate component.

<Wire Harness 5>

In FIGS. 1, 2, and 7, the wire harness 5 includes a plurality of (6 in the present embodiment) harness main bodies 13 and an electrical connection portion (so-called connector, not illustrated) provided at a terminal of the harness main body 13. Although the harness main body 13 is illustrated as one electric wire in the present embodiment, it is assumed that the harness main body 13 is actually in a bundled state including a plurality of thin electric wires. An illustrated thickness of the harness main body 13 schematically shows a thickness of the bundle. To give a supplementary description regarding the electric wire, the electric wire is not limited to the thin electric wire described above and may be a thick high-voltage electric wire (valid in cases of application other than the door 2). A conductor of the electric wire is not limited to copper or a copper alloy, and may be aluminum or an aluminum alloy. Further, the electric wire may be a shielded electric wire including a braid, a flat electric wire, a flexible flat cable (FFC), or the like. The wire harness 5 as described above is routed to the panel member 4. In performing the routing, the wire harness routing structure 7 for a panel is employed.

<Wire Harness Routing Structure 7 for Panel>

In FIGS. 1 and 2, the wire harness routing structure 7 for a panel is a structure in which the harness main body 13 accommodated in the harness accommodating groove 12 of the panel member 4 is held by the resin cured portion 21. Since the harness accommodating groove 12 is described as above, the resin cured portion 21 will be described below.

<Resin Cured Portion 21>

In FIGS. 1, 2, and 8, the resin cured portion 21 is formed of a resin with which the harness accommodating groove 12 is filled and which is cured. It is assumed that the resin used for the formation of the resin cured portion 21 is a foamed resin (foamed resin material) in the present embodiment. Examples of the reason why a foamed resin is employed are that: a foamed resin makes it possible to peel the wire harness 5 from the panel member 4 and replace the wire harness 5 at the time of maintenance; weight reduction can be achieved as compared with a case where the resin is not a foamed resin; and vibration absorbing property, cushioning property or the like is exhibited. The harness accommodating groove 12 is filled with the foamed resin via a nozzle 22 which automatically moves in at least two axial directions. In curing the foamed resin, there are various methods such as using heat or ultraviolet rays, and the method is not particularly limited. The resin cured portion 21 is formed to be a portion that covers (shelters) the harness main body 13 and protects the harness main body 13 from the outside. When the resin cured portion 21 is formed of a light-transmissive resin, the harness main body 13 can be visually recognized. A state of foaming may be independent foaming or continuous foaming. A degree of elasticity (flexibility) thereof is set as appropriate.

<Panel Routing Method for Wire Harness 5>

With reference to FIGS. 4, 7, and 8, the wire harness 5 routing method for a panel includes a harness accommodating step of accommodating the harness main body 13 of the wire harness 5 in the harness accommodating groove 12 of the panel member 4 (a step of changing from a state in FIG. 4 to a state in FIG. 7), and a harness holding step of filling the predetermined range (between one end and the other end of the harness accommodating groove 12, in the present embodiment) of the harness accommodating groove 12 with a foamed resin via the nozzle 22 in a state where the harness main body 13 is accommodated in the harness accommodating groove 12, and causing the foamed resin to cure (a step of changing from the state in FIG. 7 to a state in FIG. 8), and as illustrated in FIG. 9, the harness module 1 is manufactured by routing the wire harness 5 to the panel member 4. The manufactured harness module 1 is mounted to the door main body 3 as illustrated in FIGS. 1 and 2 using a known method.

<Effects and Advantages of Wire Harness Routing Structure 7 for Panel>

As described above with reference to FIGS. 1 to 9, according to the wire harness routing structure 7 for a panel of an embodiment of the invention, since the harness main body 13 is accommodated in the harness accommodating groove 12 formed in the panel member 4, it is possible to prevent looseness of the electric wires even without tape winding that is performed in the related art. In other words, it is possible to keep the electric wires in a state similar to that in a case where the electric wires are bundled. According to the wire harness routing structure 7 for a panel, since the harness main body 13 is accommodated in the harness accommodating groove 12, it is possible to easily form a shape conforming to the routing path (a path routing shape of the harness main body 13). Further, according to the wire harness routing structure 7 for a panel, since the portion between one end and the other end of the harness accommodating groove 12 (the predetermined range) is filled with the foamed resin and the foamed resin is in a cured state, the harness main body 13 can be held by the foamed resin in a cured state, that is, by the resin cured portion 21. In other words, even if, for example, tape winding is not performed over a wide range or a fixing operation using a clip or the like to the plurality of places is not performed, the harness main body 13 can be held by the filling and curing of the resin alone, and as a result, the workability can be improved as compared with that in the related art. Further, according to the wire harness routing structure 7 for a panel, since the harness main body 13 is accommodated in the harness accommodating groove 12, the harness main body 13 can be protected without using a tubular exterior member. Further, according to the wire harness routing structure 7 for a panel, since the tape winding, the clip, the exterior member, and the like are unnecessary, not only cost reduction because of component reduction but also automatic production can be achieved. Further, according to the wire harness routing structure 7 for a panel, when the resin cured portion 21 is formed of insulating resin, it is possible to secure insulation with respect to the harness main body 13 in a portion where the resin cured portion 21 is formed.

Further, according to the wire harness routing structure 7 for a panel, since the resin cured portion 21 is formed of the foamed resin, it is possible to peel and replace the wire harness 5 from the panel member 4 at the time of maintenance. Further, according to the wire harness routing structure 7 for a panel, the maintenance performance can be secured by employing the resin cured portion 21 formed of a foamed resin. In a case where a resin not allowing peeling (a resin in a solid state not containing foam or air bubbles) is employed, the whole part including the panel member 4 in addition to the wire harness 5 needs to be replaced, but the wire harness routing structure 7 for a panel does not require such a replacement work. Further, according to the wire harness routing structure 7 for a panel, since the resin cured portion 21 is formed of the foamed resin, weight reduction can be achieved as compared with a case where the resin is not a foamed resin, and the vibration absorbing property, cushioning property or the like can be exhibited. For example, in a case of the vibration absorbing property being exhibited, the electric wire constituting the harness main body 13 can be protected from vibration, and damage to the electric wire due to the vibration can be prevented. In addition, if the vibration is absorbed, the quietness required for the automobile can also be secured).

<Effects and Advantages of Harness Module 1>

According to the harness module 1 of an embodiment of the invention, since the wire harness 5 routing structure 7 for a panel is employed, the workability of routing is improved as compared with that in the related art. Therefore, it is possible to provide a better harness module 1.

<Effects and Advantages of Panel Routing Method>

According to the wire harness 5 routing method for a panel of an embodiment of the invention, in routing the wire harness 5 to the panel member 4, first, the harness main body 13 is accommodated in the harness accommodating groove 12, and next the predetermined range of the harness accommodating groove 12 is filled with the foamed resin and the foamed resin is cured, and therefore the wire harness 5 can be easily routed as compared with the related art.

The present invention is limited to the embodiments described above, and various changes or modifications may be made to the invention without departing from the scope of the invention.

The invention claimed is:

1. A wire harness routing structure for a panel, comprising:
a panel member that comprises a first surface and a second surface opposite to the first surface; and
a wire harness that is routed to the panel member,
wherein the first surface has a harness accommodating groove that accommodates a harness main body of the wire harness, the harness accommodating groove being recessed toward the second surface,
a protrusion is formed on the harness accommodating groove, the protrusion abuts the harness main body, and the protrusion is located between the harness main body and the harness accommodating groove,
wherein a resin cured portion that holds the harness main body is formed in the harness accommodating groove, and
the resin cured portion is formed by a resin with which a predetermined range of the harness accommodating groove is filled and which is cured.

2. The wire harness routing structure for a panel according to claim 1,
wherein the resin cured portion is formed of a foamed resin.

3. The wire harness routing structure for a panel according to claim 1,
wherein the harness accommodating groove has a depth to prevent the harness main body from protruding from an opening of the harness accommodating groove to outside.

4. The wire harness routing structure for a panel according to claim 1,
wherein at least one temporary holding portion that temporarily holds the harness main body is formed inside the harness accommodating groove.

5. The wire harness routing structure for a panel according to claim 1,
wherein a gate portion is formed at a portion defining the predetermined range to prevent outflow of the resin that has not cured.

6. The wire harness routing structure for a panel according to claim 5,
wherein the harness accommodating groove has a pair of side walls and a bottom surface that connects the pair of side walls, and
the gate portion has gate wall that extends from the bottom surface and each of the side walls and the gate portion has a U-shaped slit in the gate wall.

7. The wire harness routing structure for a panel according to claim 1,
wherein the harness accommodating groove also serves as a panel reinforcing portion of the panel member.

8. A harness module comprising:
the wire harness routing structure for a panel according to claim 1; and
at least one of a device and a component that is connected to the wire harness and mounted to the panel member.

9. The harness module according to claim 8,
wherein the harness module is formed for a door, a seat, an instrument panel, a floor, or a roof.

10. The wire harness routing structure for a panel according to claim 1,
wherein the harness accommodating groove has a pair of side walls and a bottom surface that connects the pair of side walls together,
the protrusion is an L-shaped protrusion that extends along the bottom surface and one of the side walls,
a pair of I-shaped protrusions extend from another one of the side walls, and the L-shaped protrusion is disposed between the pair of I-shaped protrusions along a length of the harness accommodating groove, and
the L-shaped protrusion and the pair of I-shaped protrusions sandwich the harness main body.

11. A wire harness routing method for a panel, comprising:
accommodating a harness main body of a wire harness in a harness accommodating groove that is formed on a first surface of a panel member and recessed toward a second surface of the panel member opposite to the first surface;
placing the harness main body on a protrusion, such that the protrusion is located between the harness main body and the harness accommodating groove; and
filling a predetermined range of the harness accommodating groove with a resin in a state where the harness main body is accommodated in the harness accommodating groove, and causing the resin to cure.

* * * * *